United States Patent [19]
Verheij

[11] 3,750,324
[45] Aug. 7, 1973

[54] LINE FLOAT HAVING LINE CLAMPING MEANS ACTUABLE BY A PULL ON THE LINE

[76] Inventor: Arend Verheij, Vinekenbrinckstraat 217, Rotterdam, Netherlands

[22] Filed: Jan. 19, 1971

[21] Appl. No.: 107,634

[30] Foreign Application Priority Data
Jan. 29, 1970 Netherlands........................ 7001283

[52] U.S. Cl............................... 43/44.88, 43/44.95
[51] Int. Cl............................................. A01k 93/00
[58] Field of Search........................ 43/44.88, 44.92, 43/44.95

[56] References Cited
UNITED STATES PATENTS
2,758,410  8/1956  Cowsert........................ 43/44.95 X
2,876,581  3/1959  Schmidt............................ 43/44.95
2,937,469  5/1960  Tiede................................ 43/44.88
2,208,240  7/1940  Arnesen et al...................... 43/44.88
2,597,737  5/1952  Kay et al........................... 43/44.88
2,163,483  6/1939  Carlisle............................. 43/44.95

Primary Examiner—F. Barry Shay
Assistant Examiner—Daniel J. Leach
Attorney—Strauch, Nolan, Neale, Nies & Kurz

[57] ABSTRACT

A float for a fishing line including a line guiding and clamping means thereon. The said means comprises a U-shaped member having one leg rotatable and rectilinearly movable in a bushing fixed on the float with an eyelet on the end of the said leg disposed adjacent one end of the bushing. The other leg of the member is also provided with an eyelet disposed co-axially with the first eyelet, the pair of eyelets guiding the fishing line. A spring biases the member toward the opposite end of the bushing, whereby when the member is rotated by a pull on the line, the spring will move the first eyelet against the end of the bushing to clamp the float on the line.

5 Claims, 3 Drawing Figures

PATENTED AUG 7 1973
3,750,324
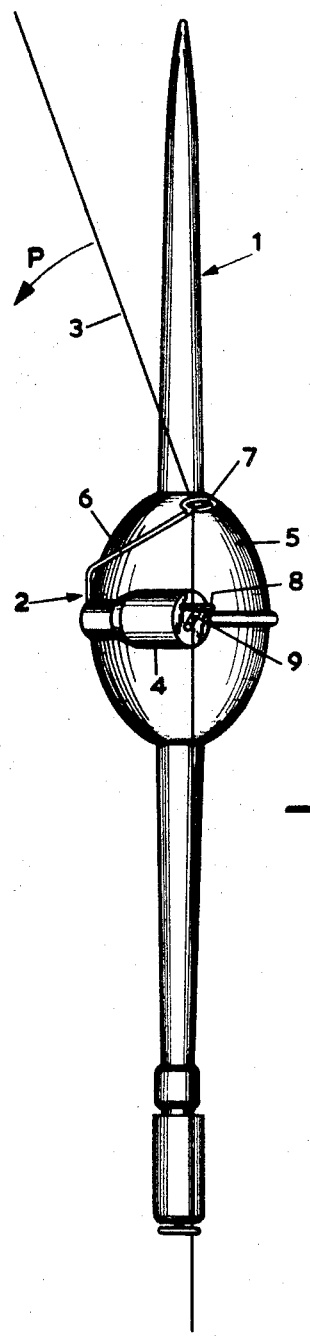
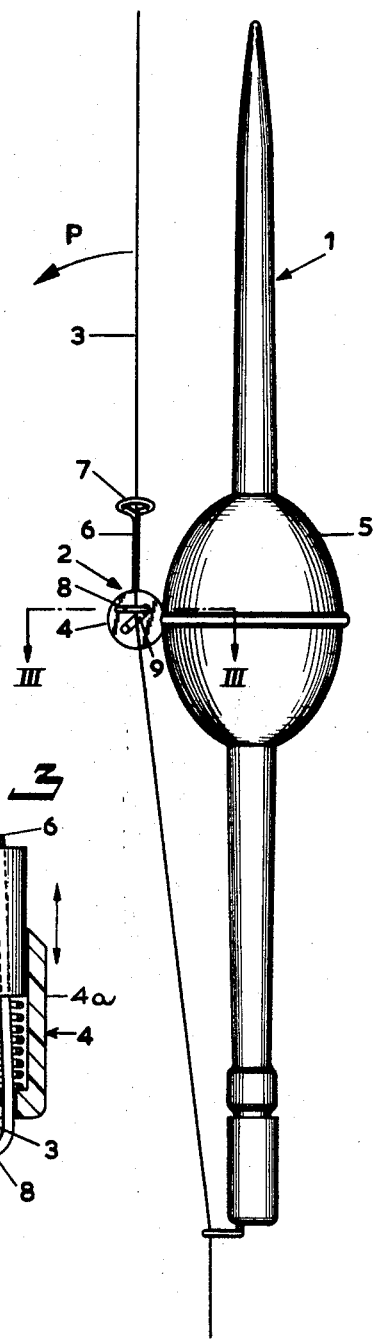
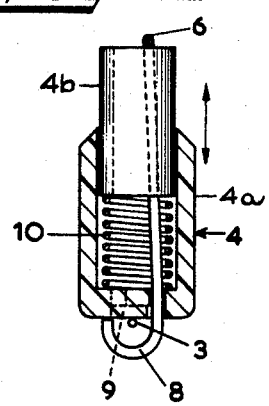
INVENTOR.
AREND VERHEIJ
BY
Strauch Nolan Neale Nies & Kurz
ATTORNEYS

LINE FLOAT HAVING LINE CLAMPING MEANS ACTUABLE BY A PULL ON THE LINE

This invention relates to a float having guiding and clamping means designed, when in use in water, to guide the float selectively along the fishing line or, initiated by a pull on the fishing line, to clamp the float on the fishing line.

A prior proposal along these lines has the disadvantage that, owing to its construction, its operation is rather unreliable, and furthermore it is easily fouled on material on the bottom.

The invention has for its object to provide an improved construction of a float of the kind in question, thereby to eliminate the above disadvantages.

According to the invention, there is provided a float having guiding and clamping means designed, when in use in water, to guide the float selectively along the fishing line or, initiated by a pull on the fishing line, to clamp the float on the fishing line, said guiding and clamping means comprising a bearing, preferably mounted tangentially to the periphery of the float for mounting a holder with a pair of, preferably co-axial eyelets for guiding a fishing line. For said holder to be rotatable and axially movable in a pre-determined angular position, one of said eyelets, during the axial movement of the holder, cooperates with an abutment for clamping the fishing line extending through said eyelet between said eyelet and the abutment. The holder may be a U-shaped member, the legs of which are at their free ends provided with an eyelet, one of the legs being supported in the bearing for rotation and for axial movement under spring action, said bearing having on the side of the adjacent eyelet an abutment having a slot receiving the eyelet.

The clamping device according to the invention may be secured to the float at any convenient point, but preferably it is mounted on the thickened central portion of the float.

To prevent easy fouling, the float is provided with a thickening increasing its buoyancy.

One embodiment of the invention will be described, by way of example, with reference to the accompanying drawings, in which FIG. 1 is a side elevational view of the float with the guiding and clamping means;

FIG. 2 is a front elevation of the float with the guiding and clamping means; and FIG. 3 is a cross-sectional view on the line III—III of FIG. 2.

Referring to the drawings, a float 1 is provided with guiding and clamping means 2 for a fishing line 3. The guiding and clamping means are composed of a bearing bushing 4 which consists of an outer member 4a and an inner member 4b and which is secured tangentially to the periphery of the thickened centre 5 of the float 1. Outer member 4a is slidable on inner member 4b as shown by the double-headed arrow in FIG. 3. Received in the bearing bushing 4 for rotation and axial movement is one leg of a U-shaped member 6. The member 6 is at the free ends of its legs provided with co-axial eyelets 7 and 8 for guiding fishing line 3.

Eyelet 8 co-operates with an end face of bearing bushing 4, in which end face is formed a slot 9 into which eyelet 8 can penetrate after sufficient turning of member 6 under the influence of a compression spring 10 accommodated in bushing 4 and around the leg of member 6. As the eyelet 8 penetrates into slot 9, the fishing line 3 is clamped between eyelet 8 and the end face of bushing 4, which fixes the float 1 relatively to fishing line 3.

After the above description, the operation of a float according to the invention will be clear. When the fishing line with the float is cast into water, the line 3 will be able to move freely through eyelets 7 and 8 in the position of member 6 relative to the float as shown in FIG. 2, so that when the lower end of the fishing line, which is weighted with a fishing hook, has reached the bottom under water, the float 1 will move upwards along fishing line 3 and come to rest on the surface of the water.

When, in this position, the member 6 is turned in the direction P by a pull on the fishing line 3, eyelet 8 will snap into slot 9 and thereby clamp the float on the line 3 at the correct height.

I claim:

1. The combination of a float for a fishing line and a line guiding and clamping means designed, when in use in water, to guide the float along the fishing line and, when actuated by a pull on the fishing line, to clamp the float on the fishing line, said guiding and clamping means comprising: a bushing fixed to the exterior of the float; a member rotatably mounted in said bushing; an eyelet formed in said member, said eyelet being disposed opposite one end of said bushing and said member being rectilinearly movable relative to said bushing when said member is rotated in said bushing to a specified position relative thereto; and means in said bushing biasing said member toward the opposite end of the bushing whereby, when said member is rotated in said bushing to said selected position, said biasing means will displace said member toward the opposite end of the bushing to clamp a fishing line extending through said eyelet against said bushing and thereby keep said float from moving relative to said line.

2. The combination of a float for a fishing line and line guiding and clamping means designed, when in use in water, to guide the float along the fishing line and, when actuated by a pull on the fishing line, to clamp the float on the fishing line, said guiding and clamping means comprising: a bushing fixed to said float; a member mounted in said bushing for rotary movement about and rectilinear movement along an axis extending transversely across said float, said member having eyelets disposed longitudinally of said float with one of said eyelets being adjacent one end of said bushing; a recess in said one end of said bushing for receiving the eyelet thereadjacent; and means in said bushing biasing said member toward the opposite end of the bushing whereby, when said member is rotated in said bushing to align said one eyelet with said recess, said biasing means will displace said member toward the opposite end of the bushing to seat said one eyelet in said recess and thereby clamp a fishing line extending through said eyelet against said bushing to keep said float from moving relative to said line.

3. The combination of claim 2, wherein the member in which the eyelets are formed has one leg extending through the bushing with said one eyelet at one end thereof, a second leg extending transversely of the bushing from the first leg at the other end of the bushing, and a third leg having a second eyelet at one end thereof so extending from the second leg as to align the second eyelet with the first eyelet longitudinally of the float.

4. The combination of claim 2, wherein said bushing includes an outer member including the said one end of the bushing in which the eyelet receiving recess is formed and an inner member, said outer member being slidable on said inner member, the member in which the eyelets are formed extending through the inner member, and the biasing means being a compression spring disposed in said outer member between the inner member and the said one end of the bushing.

5. The combination of claim 2, wherein the member extending through the bushing has a second eyelet spaced longitudinally of the float from said one eyelet, a third eyelet on said float, and means supporting said third eyelet in alignment with the aforementioned eyelets in spaced relation to said one eyelet and on the opposite side thereof from the second of the eyelets,

* * * * *